US010690341B2

(12) United States Patent
Silberstein et al.

(10) Patent No.: US 10,690,341 B2
(45) Date of Patent: Jun. 23, 2020

(54) SYSTEMS AND METHODS FOR IMPROVED WASTE GAS ABATEMENT

(71) Applicant: ALZETA Corporation, Santa Clara, CA (US)

(72) Inventors: Michael J. Silberstein, San Jose, CA (US); David Frederick Bartz, San Jose, CA (US)

(73) Assignee: ALZETA CORPORATION, Santa Clara, CA (US)

( * ) Notice: Subject to any disclaimer, the term of this patent is extended or adjusted under 35 U.S.C. 154(b) by 228 days.

(21) Appl. No.: 15/861,779

(22) Filed: Jan. 4, 2018

(65) Prior Publication Data

US 2018/0259182 A1 Sep. 13, 2018

Related U.S. Application Data

(60) Provisional application No. 62/443,062, filed on Jan. 6, 2017.

(51) Int. Cl.
*F23G 5/12* (2006.01)
*F23G 7/06* (2006.01)
(Continued)

(52) U.S. Cl.
CPC ........... *F23G 7/065* (2013.01); *B01D 53/005* (2013.01); *C10G 70/00* (2013.01); *F23G 5/12* (2013.01);
(Continued)

(58) Field of Classification Search
CPC .. F23G 2204/103; F23G 2209/14; F23G 5/12; F23G 7/065
(Continued)

(56) References Cited

U.S. PATENT DOCUMENTS 5,510,093 A 4/1996 Bartz et al.
5,603,905 A 2/1997 Bartz et al.
(Continued)

FOREIGN PATENT DOCUMENTS

WO 03009923 2/2003

OTHER PUBLICATIONS

Patent Cooperation Treaty, International Search Report for PCT/US2018/012279, 5 pages dated Apr. 30, 2018.
(Continued)

*Primary Examiner* — Avinash A Savani
(74) *Attorney, Agent, or Firm* — Bryan Cave Leighton Paisner LLP (57) ABSTRACT

The present disclosure generally relates to systems and methods for the combustive abatement of waste gas formed during the manufacture of semiconductor wafers. In particular, the systems described herein are capable of combusting air-polluting perfluorocarbons, including those having high greenhouse gas indexes such as hexafluoroethane ($C_2F_6$) and tetrafluoromethane ($CF_4$), as well as particulate-forming silicon dioxide precursors, such as silane ($SiH_4$) and tetraethoxysilane ($Si(OC_2H_5)_4$, abbreviated TEOS), with greater efficiency and lower energy usage than prior abatement systems. More particularly, and in one preferred embodiment, the present disclosure is directed to a waste gas abatement system that utilizes a combination of non-combustible and combustible gases (or gas mixtures) for thermal combustion, which are directed through multiple permeable interior surfaces of a reaction chamber, efficiently combusting waste gas and preventing undesirable accumulation of solid particulate matter on the chamber surfaces.

23 Claims, 5 Drawing Sheets

(51) Int. Cl.
  *F23G 5/24* (2006.01)
  *B01D 53/00* (2006.01)
  *C10G 70/00* (2006.01)

(52) U.S. Cl.
  CPC ...... *F23G 5/245* (2013.01); *B01D 2257/2066* (2013.01); *B01D 2257/553* (2013.01); *B01D 2257/556* (2013.01); *B01D 2258/0216* (2013.01); *F23G 2204/103* (2013.01); *F23G 2209/14* (2013.01)

(58) Field of Classification Search
  USPC .......................................................... 431/5
  See application file for complete search history.

(56) References Cited

U.S. PATENT DOCUMENTS

| | | | |
|---|---|---|---|
| 6,187,080 B1 | 2/2001 | Ping-Chung et al. | |
| 6,234,787 B1 | 5/2001 | Endoh et al. | |
| 7,494,633 B2 | 2/2009 | Stanton et al. | |
| 7,569,193 B2 | 8/2009 | Ferron et al. | |
| 7,682,574 B2 | 3/2010 | Chui et al. | |
| 7,700,049 B2 | 4/2010 | Clark et al. | |
| 7,736,599 B2 | 6/2010 | Chui et al. | |
| 7,736,600 B2 | 6/2010 | Clark et al. | |
| 7,985,379 B2 | 7/2011 | Chiu et al. | |
| 8,215,951 B2 | 7/2012 | Sullivan | |
| 2003/0054299 A1* | 3/2003 | Kawamura | B01D 53/46 431/5 |
| 2006/0104879 A1 | 5/2006 | Chiu et al. | |
| 2007/0169889 A1* | 7/2007 | Clark | B01D 53/38 156/345.29 |
| 2007/0190469 A1 | 8/2007 | Clark et al. | |
| 2009/0010816 A1 | 1/2009 | Ferron et al. | |

OTHER PUBLICATIONS

Edwards Vacuum, Atlas Systems Instruction Manual for Y350-00-880 Issue F Orginal, retrieved from edwardsvacuum.com, 278 pages 2017.

* cited by examiner

SYSTEMS AND METHODS FOR IMPROVED WASTE GAS ABATEMENT

Aspects of the present disclosure generally relate to systems and methods for the combustive abatement of waste gas formed during the manufacture of semiconductor wafers. In particular, embodiments of the systems described herein are capable of combusting air-polluting perfluorocarbons, including those having high greenhouse gas indexes such as hexafluoroethane ($C_2F_6$) and tetrafluoromethane ($CF_4$), as well as particulate-forming gases, such as silane ($SiH_4$) and tetraethoxysilane ($Si(OC_2H_5)_4$, abbreviated TEOS), with greater efficiency and lower energy usage than prior abatement systems. More particularly, and in one preferred embodiment, the present disclosure is directed to a waste gas abatement system that utilizes a combination of non-combustible and combustible gases (or gas mixtures) for thermal combustion, which are directed through multiple permeable interior surfaces of a reaction chamber.

Fluorocarbon gases such as hexafluoroethane and tetrafluoromethane are global warming compounds that, when released into the atmosphere, have extremely long lifetimes. These gases, as well as other fluorinated gases such as nitrogen trifluoride ($NF_3$) and sulfur hexafluoride ($SF_6$) are used in the manufacture of semiconductors during the etching, modification, and construction of silicon wafers, and during the cleaning of the machines used in the manufacturing process. Silicon dioxide precursors such as silane and TEOS, which form silicon dioxide ($SiO_2$; also referred to as silica) and other solids when exposed to air or combusted, are also used in the process of making silicon wafers. These fluorinated gases and hydrides, in addition to particulate matter, are typically swept out of the production machinery with nitrogen, and together may comprise the waste stream. As these gases are processed by a waste gas abatement system to reduce environmental impact, silicon-containing gas-phase molecules react to form solid deposits that may, for example, block the flow of the waste stream and may thus limit the performance of the abatement system.

Systems designed to abate waste gas of the semiconductor manufacturing process are in commercial use and employ a variety of means to receive the waste gas, oxidize the perfluorocarbons and silicon dioxide precursors, and ultimately treat the exhaust so as to prevent the release of harmful gases into the environment. These existing systems typically utilize thermal energy from fuel gas (e.g. methane) provided in a reaction chamber to heat the waste stream to sufficient levels to cause reaction of the fluorocarbons to $CO_2$ and HF, with HF being subsequently removed from the waste stream via a wet scrubber and neutralized with caustic treatment. Gases containing silicon, including silane and silicon tetrafluoride ($SiF_4$) among others, are known to produce solid-forming compounds that generate particulate matter, which can accumulate in the reaction chamber and block the passage of waste gas into the chamber. Such accumulation of particulate matter can disrupt proper mixing and reaction of waste and fuel gases, resulting in the failure of the abatement system to treat the perfluorocarbon gases and thus allowing waste gases to pass through the system untreated. Therefore, management of solid particulate matter is critical to proper waste gas abatement.

One approach to management of solid particulate matter accumulation is to provide frequent shut-downs of the abatement system to gain access to the interior and manually remove the buildup of solid formation. Such a process, however, is a costly solution that both interrupts manufacture of the semiconductor product and requires cumbersome safety protocols to prevent exposure of personnel to hazardous waste gases.

Another approach is described in U.S. Pat. No. 5,832,843, which provides for the use of mechanical scrapers for the removal of solids from the interior of the abatement system. This approach requires the exposure of the mechanical components to high-temperature corrosive gases, reducing both mechanical strength and material thickness resulting in early failure of the device.

Yet another approach is described in U.S. Pat. No. 7,569,193, which provides for the use of porous surfaces surrounding the reaction chamber. This approach provides for the use of a reaction chamber where non-reactive, cold gas is said to flow through the porous surfaces to mechanically repel solids and prevent buildup on the walls of the reaction chamber. While this approach may serve to prevent solid deposition, the relatively large volume of cold gas required to effectively prevent the accumulation of solids can negatively impact reaction rates of the waste gases, thus requiring the use of additional fuel gas to complete the desired reaction.

Yet another approach is described in U.S. Pat. No. 5,603,905, which describes a system with porous or foraminous surfaces surrounding the reaction chamber. The reaction chamber described in this patent uses pre-mixed fuel and air that are said to pass through the surfaces and ignite to establish flameless combustion on the inner surface of the reaction chamber. The heat of the reaction yields reaction products that repel solid particulate matter and prevent its deposition on the surface. As with the method described in the previous paragraph, this approach may effectively reduce and even prevent solid accumulation. Problems may arise, however, in that it can be costly and/or difficult to maintain conditions sufficient for flameless combustion across a sufficient surface area of the interior surface due to, for example, the complexity in the systems and controls required to provide a fuel having the appropriate pre-mixture to the interior surface and/or monitor combustion parameters. Certain abatement systems have attempted to overcome such difficulties by utilizing a solid (i.e. non-porous) insulated wall as the top surface of the reaction chamber, though such a design can nonetheless be susceptible to the deposition of solid particulate matter generated by combustion reactions occurring in the chamber.

Accordingly, it would be advantageous to provide an improved waste gas abatement system that reduces fuel requirements, maintains a sufficient thermal environment for waste gas reaction, and reduces the accumulation of solid particulate matter on internal surfaces of the reaction chamber.

SUMMARY OF THE INVENTION

Among the various aspects of the present disclosure are systems and methods for providing efficient and controlled combustion of gaseous semiconductor waste in a thermal reactor while reducing accumulation of deposition products within the system.

Briefly, therefore, one aspect of the present disclosure is a system for the combustive abatement of waste gas comprising a waste gas inlet, an inlet manifold configured to receive a waste gas from the waste gas inlet, a thermal reaction chamber, and a controller configured to maintain a flow of gas and control combustion at the interior surface of the inlet manifold and/or the thermal reaction chamber. The inlet manifold comprises a first plenum chamber having a first exterior wall and a first permeable interior wall, a first plenum inlet configured to supply a first gas through the first plenum chamber to the first permeable interior wall, and at least one aperture in fluid communication with the waste gas inlet extending through the first exterior wall and the first permeable interior wall. The thermal reaction chamber comprises a central chamber, a second plenum chamber at least partially surrounding the central chamber having a second plenum inlet configured to receive a supply of a second gas, a second permeable interior wall between the central chamber and the second plenum chamber, and a second exterior wall at least partially defining the second plenum chamber. In one embodiment, at least a portion of the surface of the first permeable interior wall comprises a burner surface configured for permeation of a mixture comprising combustible gas and at least a portion of the surface of the second permeable interior wall is configured for permeation of a mixture comprising non-combustible gas. In an alternate embodiment, at least a portion of the surface of the second permeable interior wall comprises a burner surface configured for permeation of a mixture comprising combustible gas and at least a portion of the surface of the first permeable interior wall is configured for permeation of a mixture comprising non-combustible gas.

Other aspects and features of the present disclosure will be in part apparent and in part described in detail hereinafter.

BRIEF DESCRIPTION OF THE DRAWINGS

These and other features, aspects, and advantages of the disclosure will become more fully apparent from the following detailed description, appended claims and accompanying drawings, wherein the drawings illustrate features in accordance with exemplary embodiments of the disclosure, and wherein:

DETAILED DESCRIPTION OF THE PREFERRED EMBODIMENTS

Aspects of the present disclosure relate to systems and methods for providing energy-efficient, controlled abatement of waste gases in a thermal reactor while reducing accumulation of decomposition products within the system.

Figure 1:
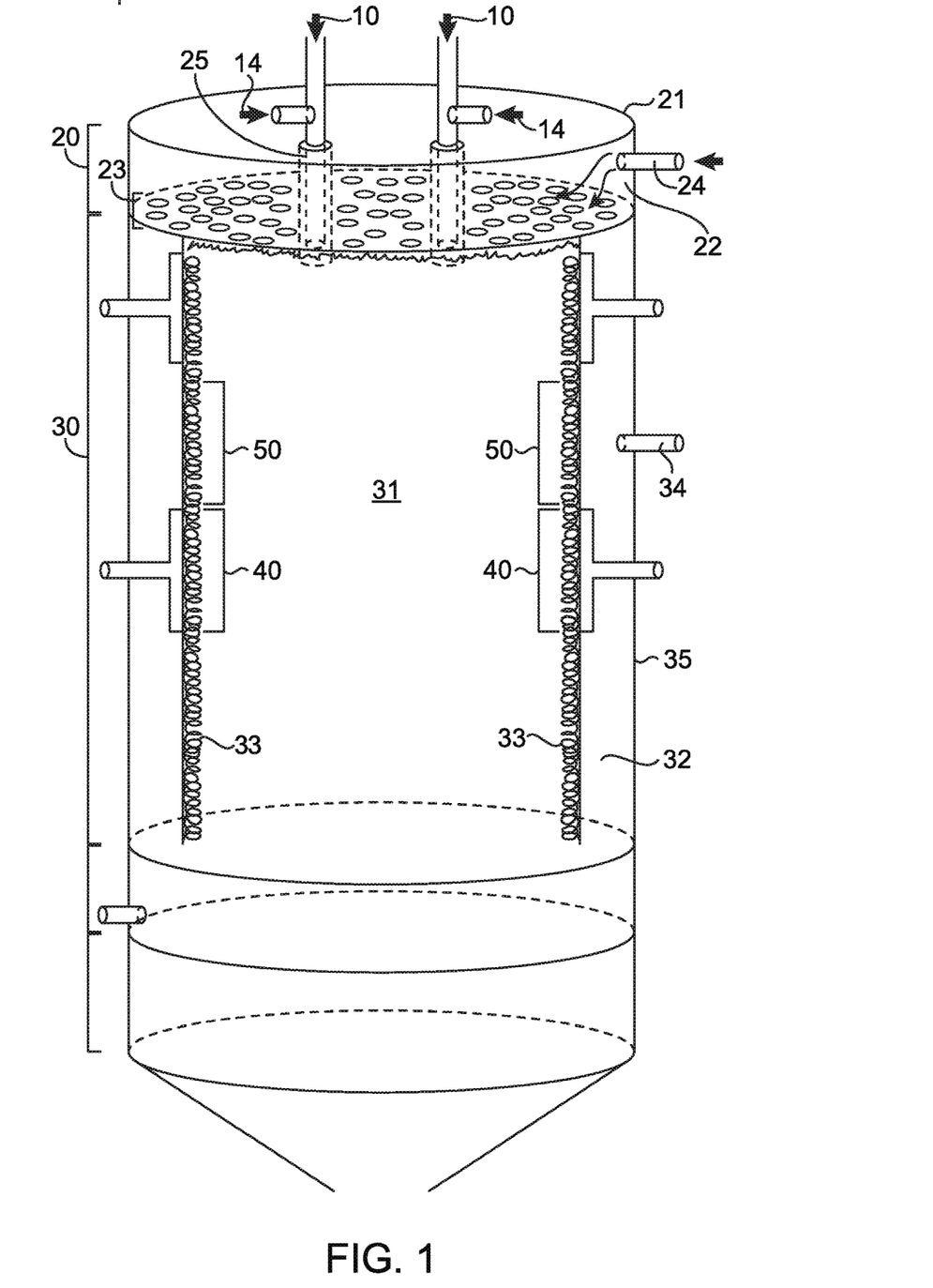
FIG. 1 is a schematic cross-section of an exemplary embodiment of a waste gas abatement system according to one aspect of the present disclosure.

FIG. 1 depicts a cross-sectional structural diagram of waste gas abatement system 1 (also referred to as a furnace) according to a first embodiment of the present disclosure. Waste gas abatement system 1 comprises one or more waste gas inlet(s) 10 for the delivery of waste gas produced during a manufacturing process, for example, the manufacture of semiconductor wafers, to a thermal reaction chamber 30 for destruction. Waste gas of the semiconductor manufacturing process typically comprises halogenated compounds, particulate-forming matter, or a combination of halogenated compounds and particulate-forming matter. In some embodiments, the one or more waste gas inlet(s) 10 may comprise one or more nozzles or tubes inserted into one or more openings in, or configured to pass through one or more apertures of, inlet manifold 20, where inlet manifold 20 may be located at a terminal portion of thermal reaction chamber 30, as shown in FIG. 1, or may be located in another region. In one embodiment, waste gas abatement system 1 comprises one waste gas inlet 10 that is configured to deliver one waste gas or a combination of waste gases through inlet manifold 20 to reaction chamber 30. In another embodiment, waste gas abatement system 1 comprises more than one waste gas inlet 10, the waste gas inlets being configured to deliver one or more than one waste gas through inlet manifold 20 to reaction chamber 30. By way of example, in waste gas abatement systems comprising more than one waste gas inlet, each waste gas inlet may deliver the same waste gas or act independently to deliver different waste gases through inlet manifold 20 to reaction chamber 30 (e.g. in a system comprising multiple waste gas inlets, each of the multiple waste gas inlets may deliver the same gas or different gases into the reaction chamber).

In any of the above embodiments, inlet manifold 20 may be coupled to waste gas inlet(s) 10 at aperture 25 in a configuration where waste gas inlet(s) 10 is/are in fluid communication with thermal reaction chamber 30 via aperture 25 (as shown in FIG. 1). In certain embodiments, waste gas inlet(s) 10 may be further configured to supply the waste gas in combination with an oxidant, fuel (e.g. methane, ethane, propane, butane, or natural gas), and/or inert gas via supplemental gas inlet 14, where the waste gas may be mixed with such oxidant, fuel, and/or inert gas prior to or simultaneous with passing through aperture 25 for communication to thermal reaction chamber 30, thus improving the destruction of, for example, perfluorocarbon waste gases.

Generally, inlet manifold 20 comprises a disc-shaped component as shown in FIG. 1, though inlet manifold 20 may comprise any shape compatible with the communication of waste gas from waste gas inlet(s) 10 to thermal reaction chamber 30 as described more fully below. More specifically, again with reference to FIG. 1, inlet manifold 20 comprises a first exterior wall 21 and a first permeable interior wall 23, forming the boundary of a first plenum chamber 22. First permeable interior wall 23 comprises pores that are sized to permit the passage of a gas, and may extend across substantially an entire surface of an interior wall dividing inlet manifold 20 from thermal reaction chamber 30. First plenum chamber 22 further comprises a plenum inlet 24 that is configured to supply a first gas (e.g. air, nitrogen, inert gas, oxidant, fuel, etc., or a combination thereof) through the first plenum chamber 22 to the first permeable interior wall 23. In certain embodiments, the first gas may comprise an oxidant, a non-combustive gas, or a combustive gas; more specifically, the first gas may comprise nitrogen, oxygen, air, hydrogen, gaseous hydrocarbons, or mixtures thereof.

A plenum chamber as used herein means an enclosed or partially enclosed chamber intended to collect or confine gas or a combination of gases for the purpose of distributing said gas(es) in a desired manner. Accordingly, a plenum chamber for use in accordance with certain aspects of the present disclosure functions to distribute gas (i.e. a purge gas) in a substantially even manner to the permeable interior wall and to provide a sealed volume that prevents flow of such gas to locations other than the permeable interior wall. The gas used for such purpose is preferably both inexpensive and chemically stable/non-reactive, and may be selected from, for example, air, nitrogen, an inert gas (other than nitrogen), or combinations thereof. Air or a combination of air and another gas is generally preferable, however, as the incorporation of oxygen allows for improved destruction of waste gas, including perfluorocarbons, in the reaction chamber when compared to the use of nitrogen alone. In certain embodiments, the purge gas (e.g. air, nitrogen, inert gas, or combination thereof) may be dispensed to the relevant plenum chamber at room temperature. In yet other embodiments, the purge gas (e.g. air, nitrogen, inert gas, or combination thereof) may be cooled to below room temperature prior to being dispensed to the relevant plenum chamber. In yet other embodiments, the purge gas (e.g. air, nitrogen, inert gas, or combinations thereof) may be heated to above room temperature prior to being dispensed to the relevant plenum chamber. In yet other embodiments, the purge gas (e.g. air, nitrogen, inert gas, or combinations thereof) may be dispensed to the relevant plenum chamber within the range of room temperature to the temperature required for combustion in the reaction chamber. In yet other embodiments, the purge gas (e.g. air, nitrogen, inert gas, or combinations thereof) may be dispensed to the relevant plenum chamber at a temperature less than the temperature required for combustion in the reaction chamber. While the purge gas may be useful at a variety of temperatures, it is generally preferred that the purge gas is dispensed at a relatively cool temperature (e.g. ambient temperature), which advantageously allows for the use of a wider variety of construction materials that may increase durability and decrease cost.

Referring again to FIG. 1, separate and apart from plenum inlet 24, at least one aperture 25 is coupled to waste gas inlet(s) 10 and extends through first exterior wall 21, axially through (i.e. across the width of) inlet manifold 20 and to central chamber 31, allowing waste gas to flow substantially unobstructed from waste gas inlet(s) 10 through aperture 25 and into thermal reaction chamber 30. In some embodiments, waste gas inlet(s) 10 extend entirely across the width of inlet manifold 20 (through aperture 25) to central chamber 31, i.e. terminating at or in close proximity to first interior permeable surface 23. In other embodiments, waste gas inlet(s) 10 extend at least about 90% of the width of inlet manifold 20 (through aperture 25) to central chamber 31. In yet other embodiments, waste gas inlet(s) 10 extend at least about 85%, 80%, 75%, 70%, 65%, 60%, 55%, 50%, 40%, 30%, or 25% of the width of inlet manifold 20 (through aperture 25) to central chamber 31. In yet other embodiments, waste gas inlet(s) 10 and at least one aperture 25 comprise separate concentric tubes having termination points at or in close proximity to interior permeable surface 23. In a preferred embodiment, interior permeable surface 23 does not cover, coat, or otherwise obstruct the flow of waste gas from waste gas inlet(s) 10 through aperture 25 to central chamber 31.

As shown in FIG. 1, plenum inlet 24 is located at a periphery of first plenum chamber 22, whereas aperture 25 extends axially through the plenum chamber at, for example, a central region of the plenum chamber. Inlet manifold 20 may comprise one, two, three, four, five, six, or more apertures configured to permit communication of waste gas from waste gas inlet(s) 10 through inlet manifold 20 to thermal reaction chamber 30. The one or more apertures may be arranged in any geometric configuration and/or position with respect to one another and with respect to any other component of the inlet manifold, so long as the geometric configuration and/or position permits a substantially unobstructed flow of waste gas from the waste gas inlet to the thermal reaction chamber.

The one or more apertures according to the present disclosure may comprise a variety of shapes and sizes consistent with the delivery of waste gas from the waste gas inlet(s) to the reaction chamber. In certain embodiments, the diameter of at least one aperture is in the range of about ¼ inch to about 4 inches. In other embodiments, the diameter of at least one aperture is in the range of about ½ inch to about 2 inches. In yet other embodiments, the diameter of at least one aperture is in the range of about ¾ inches to about 1¼ inches. In yet another embodiment, the diameter of at least one aperture is about 1 inch. In embodiments of the present disclosure comprising more than one aperture, the apertures of such embodiments may have diameters that are the same as or different from one another.

Additionally, to further prevent the deposition of solid particulate matter within and in the near vicinity of the aperture through which the waste gas inlet(s) communicate waste gas into the thermal reaction chamber, one or more apertures may further comprise one or more micro-apertures. Such micro-aperture(s) may be in fluid communication with the first or second plenum chamber, allowing a small amount of gas other than waste gas (e.g. air, nitrogen, or an inert gas) to flow from the plenum chamber through the micro-aperture(s), along the sidewall(s) of the aperture between the aperture wall and the waste gas inlet wall, and into the thermal reaction chamber. In certain embodiments, the micro-aperture(s) may range in size from about 0.01 to about 0.25 inches in diameter. In certain other embodiments, the micro-aperture(s) may range in size from about 0.031 to about 0.063 inches (or about ¹⁄₃₂ to about ¹⁄₁₆ inches) in diameter. In embodiments having more than one micro-aperture, the micro-apertures may be the same size or different sizes.

Again referring to FIG. 1, thermal reaction chamber 30 is configured to receive waste gas from waste gas inlet(s) 10 through at least one aperture 25 providing a passage through inlet manifold 20. Thermal reaction chamber 30 is further configured to receive a first gas (e.g. air, nitrogen, or an inert gas) from the first plenum chamber 22 through the first permeable interior wall 23. Thermal reaction chamber 30 comprises a central chamber 31 where combustion occurs and combustion products interact with the waste gas resulting in nearly complete conversion of the waste gas into products that may be easily treated and removed prior to expulsion into the environment. Central chamber 31 may be adjacent to, at least partially surrounded by, or substantially fully surrounded by a second plenum chamber 32. Central chamber 31 and second plenum chamber 32 are separated by a second permeable interior wall 33. Second plenum chamber 32 further comprises a plenum inlet 34 that is configured to receive a supply of a second gas (e.g. air, nitrogen, inert gas, oxidant, fuel, etc.) through the second plenum chamber 32 to the second interior permeable wall 33. Second plenum chamber 32 is defined, or at least partially defined, by a second exterior wall 35. In certain embodiments, the second gas may comprise an oxidant, a non-combustive gas, or a combustive gas; more specifically, the second gas may comprise nitrogen, oxygen, air, hydrogen, gaseous hydrocarbons, or mixtures thereof.

A controller is configured to maintain a flow of the first gas, the second gas, or both the first and second gas passing from plenum inlets 24, 34 into plenum chambers 22, 32, respectively. The controller is further configured to control combustion of, for example, a fuel gas or a combustible gas mixture at the surface of at least a portion of first permeable interior wall 23 and/or second permeable interior wall 33.

In the embodiment depicted in FIG. 1, at least a portion of the surface of the first permeable interior wall 23 is configured for permeation of a mixture comprising non-combustible gas and at least a portion of second permeable interior wall 33 comprises a burner surface 40 configured for permeation of a mixture comprising combustible gas.

Figure 2:
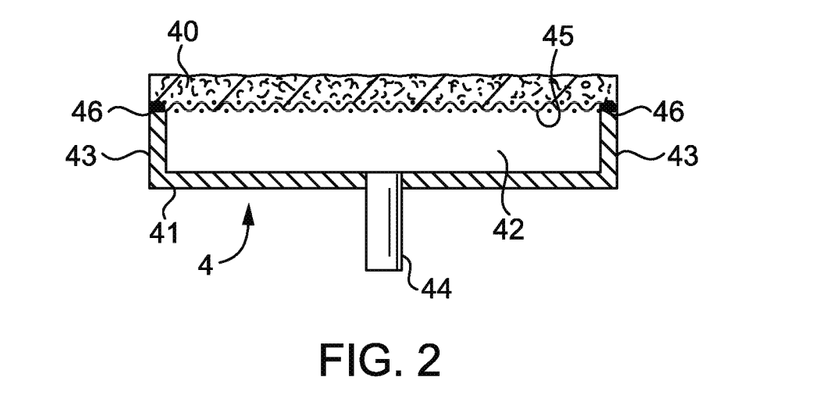
FIG. 2 is a schematic cross-section of an embodiment of a burner module for use in accordance with aspects of the present disclosure, the burner module having a burner surface configured for permeation of a mixture comprising combustible gas.

A burner surface according to the present disclosure may be defined as an area of a permeable surface which stabilizes the combustion reaction of a gas or liquid fuel or combinations thereof. FIG. 2 illustrates an exemplary burner module having a burner surface configured for permeation of a mixture comprising combustible gas. More specifically, FIG. 2 depicts a cross-section of a pan-type porous fiber layer burner 4 transverse to its length. Metal pan 41 has side walls 43 with screen 45 welded to the ends 46 of side walls 43. A porous layer 40 of ceramic and/or metal fibers may be deposited on, and attached to, screen 45. Porous layer 40 provides the exit surface at which a mixture of combustible gas, comprising, for example, a mixture of fuel gas (e.g. methane, ethane, propane, butane, or natural gas) and air, will burn without visible flame and become radiant. The combustible gas may be fed to burner 4 through feedline 44 through burner plenum chamber 42, where feedline 44 may be connected to metal pan 41. In certain embodiments, a burner module for use in accordance with the present disclosure may be configured for permeation of a mixture consisting essentially of combustible gas or a mixture of combustible gases. Other exemplary burner modules that may be used in accordance with the present disclosure are described in U.S. Pat. Nos. 8,215,951, 5,439,372, and 5,326,631, each of which are incorporated herein.

Figure 3:
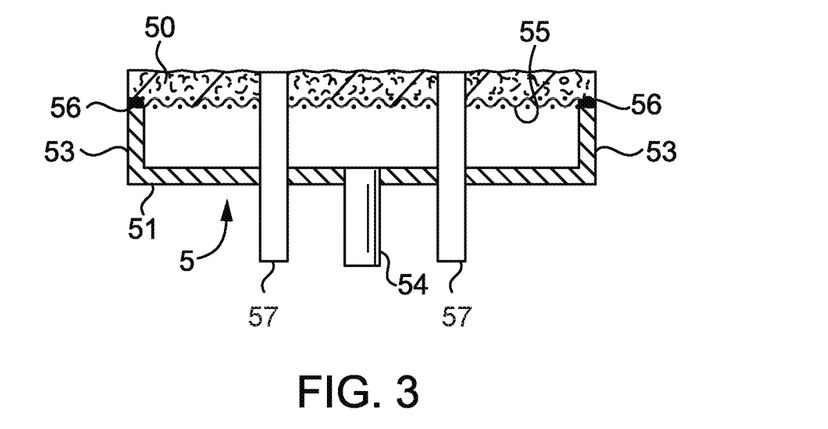
FIG. 3 is a schematic cross-section of an embodiment of a non-burner permeable wall module for use in accordance with aspects of the present disclosure, the non-burner permeable wall module having a surface configured for permeation of a mixture comprising non-combustible gas.

FIG. 3 illustrates an exemplary non-burner permeable wall module configured for permeation of a mixture comprising non-combustible gas. Said non-burner permeable wall module 5 has an exterior wall 51 and side walls 53, with screen 55 welded to the ends 56 of side walls 53. A porous layer 50 of high temperature metal fibers may deposited on, and attached to, screen 55. Non-burner permeable wall surface 50 provides the exit surface of a non-combustible gas, comprising, for example, an inert gas, nitrogen, air, or combinations thereof. The non-combustible gas is supplied to the module by plenum inlet 54. One or more tubes (i.e. feedlines) 57 for the delivery of waste gas to the reaction zone (i.e. the thermal reaction chamber) may penetrate through exterior wall 51 and, as shown in FIG. 3, extend partially or completely through the module to, or through, non-burner permeable wall surface 50. In certain embodiments, a non-burner permeable wall module for use in accordance with the present disclosure may be configured for permeation of a mixture consisting essentially of non-combustible gas or a mixture of non-combustible gases.

In one embodiment of the waste abatement system of the present disclosure, referring again to FIG. 1, at least a portion of the surface of second permeable interior wall 33 comprises a burner surface configured for permeation of a mixture comprising a combustible gas and at least a portion of the surface of second permeable interior wall 33 is configured for permeation of a mixture comprising non-combustible gas. More specifically, in certain embodiments, 100% of the surface of second permeable interior wall 33 comprises a burner surface configured for permeation of a mixture comprising a combustible gas. In another embodiment, at least 90% of the surface of second permeable interior wall 33 comprises a burner surface configured for permeation of a mixture comprising a combustible gas. In yet another embodiment, at least 80% of the surface of second permeable interior wall 33 comprises a burner surface configured for permeation of a mixture comprising a combustible gas. In yet another embodiment, at least 75% of the surface of second permeable interior wall 33 comprises a burner surface configured for permeation of a mixture comprising a combustible gas. In yet another embodiment, at least 70% of the surface of second permeable interior wall 33 comprises a burner surface configured for permeation of a mixture comprising a combustible gas. In yet another embodiment, at least 60% of the surface of second permeable interior wall 33 comprises a burner surface configured for permeation of a mixture comprising a combustible gas. In yet another embodiment, at least 50% of the surface of second permeable interior wall 33 comprises a burner surface configured for permeation of a mixture comprising a combustible gas. In yet another embodiment, at least 40% of the surface of second permeable interior wall 33 comprises a burner surface configured for permeation of a mixture comprising a combustible gas. In yet another embodiment, at least 30% of the surface of second permeable interior wall 33 comprises a burner surface configured for permeation of a mixture comprising a combustible gas. In yet another embodiment, at least 25% of the surface of second permeable interior wall 33 comprises a burner surface configured for permeation of a mixture comprising a combustible gas. In yet another embodiment, at least 20% of the surface of second permeable interior wall 33 comprises a burner surface configured for permeation of a mixture comprising a combustible gas. In yet another embodiment, at least 10% of the surface of second permeable interior wall 33 comprises a burner surface configured for permeation of a mixture comprising a combustible gas. In yet another embodiment, at least 5% of the surface of second permeable interior wall 33 comprises a burner surface configured for permeation of a mixture comprising a combustible gas. Conversely, in any of the above-described embodiments, at least 5%, 10%, 20%, 25%, 30%, 40%, 50%, 60%, 70%, 75%, 80%, 90%, or 99%, and up to 100%, of first permeable interior wall 23 is configured for permeation of a mixture comprising a non-combustible gas (i.e. a non-burner surface). In an exemplary embodiment, 100% of the surface of second permeable interior wall 33 comprises a burner surface configured for permeation of a mixture comprising a combustible gas and 100% of the surface of first permeable interior wall 23 is configured for permeation of a mixture comprising a non-combustible gas.

In an alternative embodiment, comprising all of the elements of FIG. 1 and differing only in this respect, 100% of the surface of first permeable interior wall 23 comprises a burner surface 40 configured for permeation of a mixture comprising a combustible gas. In another embodiment, at least 90% of the surface of first permeable interior wall 23 comprises a burner surface 40 configured for permeation of a mixture comprising a combustible gas. In yet another embodiment, at least 80% of the surface of first permeable interior wall 23 comprises a burner surface 40 configured for permeation of a mixture comprising a combustible gas. In yet another embodiment, at least 75% of the surface of first permeable interior wall 23 comprises a burner surface 40 configured for permeation of a mixture comprising a combustible gas. In yet another embodiment, at least 70% of the surface of first permeable interior wall 23 comprises a burner surface 40 configured for permeation of a mixture comprising a combustible gas. In yet another embodiment, at least 60% of the surface of first permeable interior wall 23 comprises a burner surface 40 configured for permeation of a mixture comprising a combustible gas. In yet another embodiment, at least 50% of the surface of first permeable interior wall 23 comprises a burner surface 40 configured for permeation of a mixture comprising a combustible gas. In yet another embodiment, at least 40% of the surface of first permeable interior wall 23 comprises a burner surface 40 configured for permeation of a mixture comprising a combustible gas. In yet another embodiment, at least 30% of the surface of the first permeable interior wall 23 comprises a burner surface 40 configured for permeation of a mixture comprising a combustible gas. In yet another embodiment, at least 25% of the surface of first permeable interior wall 23 comprises a burner surface 40 configured for permeation of a mixture comprising a combustible gas. In yet another embodiment, at least 20% of the surface of first permeable interior wall 23 comprises a burner surface 40 configured for permeation of a mixture comprising a combustible gas. In yet another embodiment, at least 10% of the surface of first permeable interior wall 23 comprises a burner surface 40 configured for permeation of a mixture comprising a combustible gas. In yet another embodiment, at least 5% of the surface of first permeable interior wall 23 comprises a burner surface 40 configured for permeation of a mixture comprising a combustible gas. Conversely, in any of the above-described embodiments, at least 5%, 10%, 20%, 25%, 30%, 40%, 50%, 60%, 70%, 75%, 80%, 90%, or 99%, and up to 100%, of second permeable interior wall 33 is configured for permeation of a mixture comprising a non-combustible gas (i.e. a non-burner permeable wall surface, FIG. 1 reference 50). In an exemplary embodiment, 100% of the surface of first permeable interior wall 23 comprises a burner surface 40 configured for permeation of a mixture comprising a combustible gas and 100% of the surface of second permeable interior wall 33 is configured for permeation of a mixture comprising a non-combustible gas.

Figure 4:
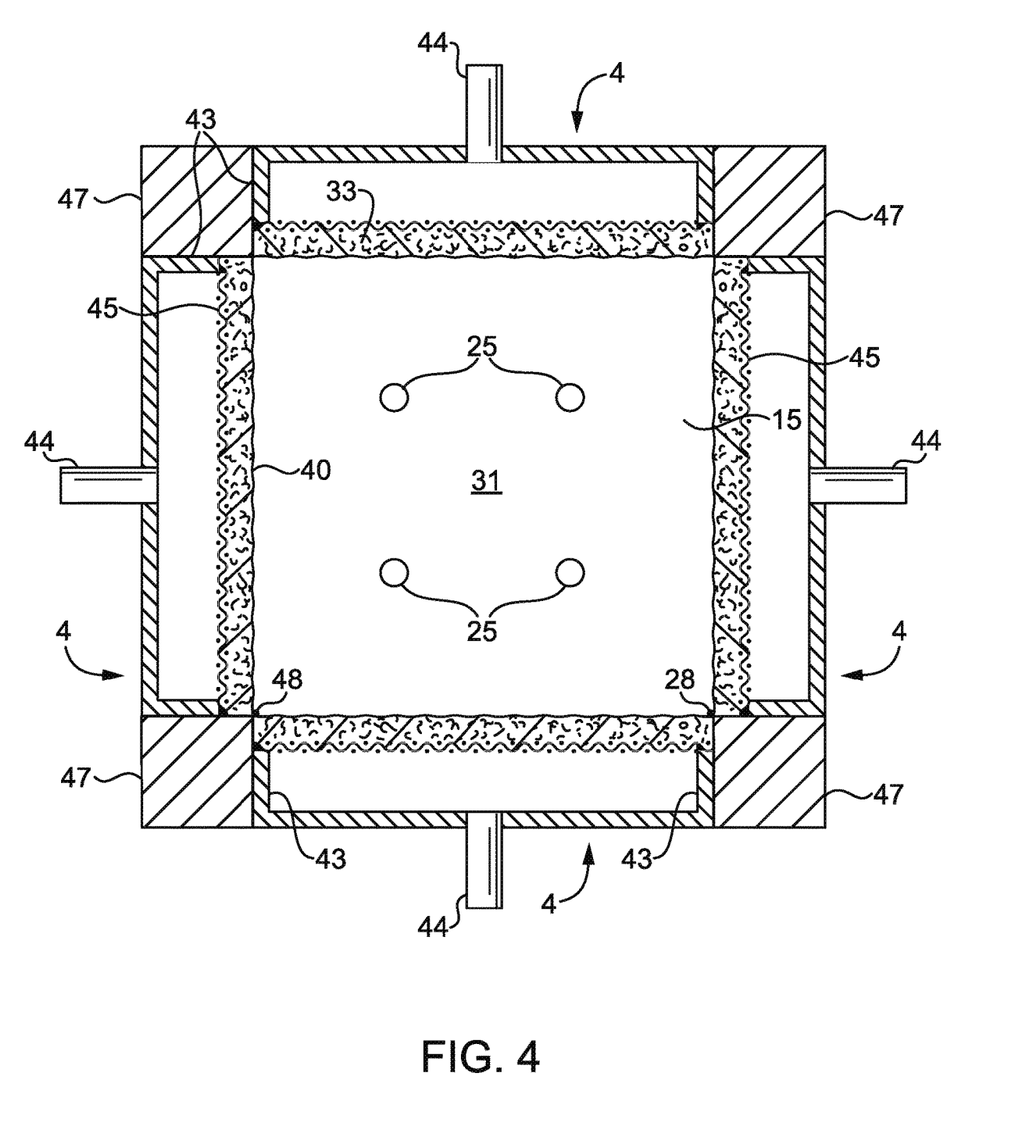
FIG. 4 is a schematic cross-section of an embodiment of a thermal reaction chamber, viewed from the bottom up, of a waste gas abatement system according to aspects of the present disclosure, the interior surface of the reaction chamber being configured for permeation of a mixture comprising combustible gas.

FIG. 4 illustrates an embodiment of the interior of a thermal reaction chamber, viewed from the bottom up, of a waste gas abatement system according to aspects of the present disclosure. Referring to FIG. 4, second interior permeable wall(s) 33 (comprising exit surface(s) 40) of the thermal reaction chamber are configured for permeation of a mixture comprising combustible gas and ceiling surface 15 is configured for permeation of a mixture comprising non-combustible gas. The thermal reaction chamber shown in FIG. 4 has four burner modules 4 (e.g. the burner module shown in FIG. 2) arranged to form a central reaction chamber 31. Burner modules 4 may meet at right angles to one another with a refractory post 47 cemented to side walls 43 of contiguous burner modules 4 so that gases cannot leak along the vertical juncture line 48 of contiguous burner modules 4. A non-burner permeable wall module (e.g. non-burner permeable wall module 5 as shown in FIG. 3) may be attached to the edges of burner module 4 forming, in whole or in part, ceiling surface 15 and serving as the fifth face (i.e. the top or ceiling) of central chamber 31. By this arrangement, four burner modules 4 act as an inwardly fired furnace with central chamber 31 surrounded by the exit surface of burner module 4 and non-burner permeable wall module 5. Waste gas may travel through a waste gas inlet through aperture(s) 25 in a path normal to the page into central chamber 31. Upon entering central chamber 31, waste gas may be repelled from non-burner permeable wall module surface 15 by gas flow travelling through permeable wall module surface 15, normal to the page. Products of combustion from second interior permeable wall 33 travel perpendicular to the path of the waste gas aiding in destruction of waste gases, demonstrating that a furnace suitable for use in accordance with the present disclosure may comprise one or more burner modules and one or more non-burner permeable wall modules.

In other embodiments, comprising all of the elements of FIG. 1 and differing only in this respect, at least a portion of the surface of first permeable interior wall 23 is a ring-shaped burner having a surface configured for permeation of a mixture comprising combustible gas. In another embodiment, at least a portion of the surface of second permeable interior wall 33 is a ring-shaped burner having a surface configured for permeation of a mixture comprising combustible gas. In yet another embodiment, a portion of first permeable interior wall 23 and a portion of second permeable interior wall 33 are comprised of a ring-shaped burner, each having surfaces configured for permeation of a mixture comprising combustible gas. In yet another embodiment, first permeable interior wall 23 comprises concentric ring-shaped burners with gaps between the ring-shaped burners consisting of permeable interior wall surface configured for permeation of a mixture comprising non-combustible gas. In yet another embodiment, second permeable interior wall 33 comprises vertically-alternating rings of burner surface and surface configured for permeation of non-combustible gas. In certain exemplary embodiments comprising a ring-shaped burner, the ring width may range from about 15% to about 50% of the radius of the inlet manifold and/or the thermal reaction chamber.

In certain embodiments, including the embodiment of FIG. 1, first permeable interior wall 23 comprises at least a portion, or substantially all, of the upper surface (e.g. a substantially horizontal ceiling) of thermal reaction chamber 30 and second permeable interior 33 wall comprises at least a portion, or substantially all, of a sidewall (e.g. a substantially vertical column) of thermal reaction chamber 30. In another embodiment, first permeable interior wall 23 comprises at least a portion, or substantially all, of the sidewall (e.g. a substantially vertical column) of thermal reaction chamber and second permeable interior wall 33 comprises at least a portion of the upper surface (e.g. a substantially horizontal ceiling) of thermal reaction chamber 30. In one embodiment, the permeable interior wall may extend from a top of the sidewall in proximity to the ceiling, to a bottom of the sidewall in proximity to a base of the thermal reaction chamber. In yet another embodiment, the permeable interior wall may extend at least 10% but less than 100% of the length of the sidewall, such as at least 20% but less than 80% of the length of the sidewall, and even at least 30% but less than 50% of the length of the sidewall. The permeable interior wall may also extend at least partially circumferentially about a central axis of the reaction chamber, and may even extend the entire 360 degrees about the central axis of the reactor chamber. For example, the permeable interior wall may extend at least 90 degrees and up to 360 degrees, about the central axis of the reaction chamber. In yet another embodiment, a plurality of permeable interior portions may be provided about the central axis, with individual permeable interior portions ranging in width from 10 degrees or less to 90 degrees or more.

In each of the embodiments described herein, it may be advantageous to configure the inlet manifold and the thermal reaction chamber such that the first and second permeable interior walls have a specified surface area ratio. Referring to FIG. 1, in an exemplary embodiment, first permeable interior wall 23 and second permeable interior wall 33 have a surface area ratio ranging from about 1:1 to about 1:10. In another embodiment, first permeable interior wall 23 and second permeable interior wall 33 have a surface area ratio ranging from about 1:2 to about 1:5. In certain preferred embodiments, first permeable interior wall 23 and second permeable interior wall 33 have a surface area ratio of about 1:2, 1:3, 1:4, or 1:5.

The inlet manifold and thermal reaction chamber comprising waste gas abatement system 1 may form any desirable three-dimensional shape. In certain embodiments, the inlet manifold and thermal reaction chamber may form, alone or in combination, a cube, rectangular prism, or cylinder. In a preferred embodiment, referring to FIG. 1, inlet manifold 20 and thermal reaction chamber 30 are substantially cylindrical. The first and second permeable interior walls may similarly form any desirable shape that is the same as or different from the inlet manifold and/or the thermal reaction chamber of which they are a part. More specifically, one or both of the first permeable interior wall and the second permeable interior wall may be substantially flat (e.g. substantially a two-dimensional rectangle or disc), cubic, cylindrical, or any other shape allowing for their functionality, including gas permeability, to be maintained. In a preferred embodiment, referring to FIG. 1, first permeable interior wall 23 is substantially flat and disc-shaped and second permeable interior wall 33 is cylindrical.

In one embodiment, the inlet manifold is substantially cylindrical with a length to diameter ratio of between about 1:1 and about 1:6. In another embodiment, the inlet manifold is substantially cylindrical with a length to diameter ratio of between about 1:2 and about 1:5. In yet another embodiment, the inlet manifold is substantially cylindrical with a length to diameter ratio of between about 1:2 to about 1:6. In yet another embodiment, the inlet manifold is substantially cylindrical with a length to diameter ratio of between about 1:2 to about 1:4. In yet another embodiment, the inlet manifold is substantially cylindrical with a length to diameter ratio of about 1:1, 1:2, 1:3, 1:4, 1:5, or 1:6.

In one embodiment, the thermal reaction chamber is substantially cylindrical with a length to diameter ratio of between about 1:4 to about 10:1. In another embodiment, the thermal reaction chamber is substantially cylindrical with a length to diameter ratio of between about 1:2 and about 8:1.

Interior permeable walls according to the present disclosure may be fabricated from a variety of materials, including any material having characteristics suitable for use as a permeable wall in a thermal reaction chamber environment. In some embodiments, one or both permeable interior walls are fabricated from ceramic foam, metal foam, ceramic fibers or a permeable matrix of ceramic fibers, metal fibers or a permeable matrix of metal fibers, or combinations thereof. In embodiments comprising metal fibers, the metal fibers may be sintered or non-sintered. In certain embodiments, the interior permeable walls are durable such that they may withstand cleaning if solids deposit on their surfaces, are able to withstand high temperatures (e.g. greater than 1800° F.), are resistant to corrosion, and are comprised of material that is not prone to cracking. In a preferred embodiment, one or both permeable interior walls comprises a high-temperature metal alloy comprising iron, chromium, nickel, aluminum, or combinations or alloys thereof. Flow resistance of one or both permeable interior walls may be sufficient to maintain a relatively cool temperature (e.g. room temperature) inside the plenum with which the relevant permeable interior wall is in fluid communication, and such flow resistance is preferably adequate to distribute the purge gas (e.g. air, nitrogen, inert gas, or combinations thereof) to the surface of the interior permeable wall. Optionally, one or both interior permeable walls may be formed on a substrate where, in an exemplary embodiment, the substrate is a perforated steel plate. In certain embodiments, one or both permeable walls may be configured to achieve a flow rate (velocity) of purge gas in the range of about 0.05 to about 10 feet per second or, more specifically, in the range of about 0.1 to about 0.4 feet per second. In other embodiments, one or both permeable walls may have a porosity/void volume fraction ranging from about 50% to about 99.9%. In yet other embodiments, one or both permeable walls may have a porosity/void volume fraction of at least about 50%, 55%, 60%, 65%, 70%, 75%, 80%, 85%, 90%, or 95%. The relatively high porosity/void volume fraction of one or more permeable walls of the embodiments of the present disclosure advantageously minimizes the surface area within the reaction chamber available for deposition of unwanted solid byproducts, thus improving the performance of the systems described herein.

The thickness and composition of interior permeable walls 23, 33 significantly aid or constrain the flow of gas from plenum chambers 22, 32 through interior permeable walls 23, 33. Interior permeable walls 23, 33 may have an average thickness ranging from about 0.125 inches to about 2 inches. In certain embodiments, interior permeable walls 23, 33 may have an average thickness ranging from about 0.25 inches to about 2 inches. In certain embodiments, interior permeable walls 23, 33 may have an average thickness ranging from about 0.25 inches to about 0.75 inches. In certain embodiments, interior permeable walls 23, 33 may have an average thickness ranging from about 0.25 inches to about 1 inch. In one embodiment, interior permeable walls 23, 33 may have an average thickness of 0.125 inches. In another embodiment, interior permeable walls 23, 33 may have an average thickness of 0.25 inches. In yet another embodiment, interior permeable walls 23, 33 may have an average thickness of 0.4 inches. In yet another embodiment, interior permeable walls 23, 33 may have an average thickness of 0.5 inches. In yet another embodiment, interior permeable walls 23, 33 may have an average thickness of 0.6 inches. In yet another embodiment, interior permeable walls 23, 33 may have an average thickness of 0.75 inches. In yet another embodiment, interior permeable walls 23, 33 may have an average thickness of 1 inch. In yet another embodiment, interior permeable walls 23, 33 may have an average thickness of 1.25 inches. In yet another embodiment, interior permeable walls 23, 33 may have an average thickness of 1.5 inches. In yet another embodiment, interior permeable walls 23, 33 may have an average thickness of 1.75 inches. In yet another embodiment, interior permeable walls 23, 33 may have an average thickness of 2 inches. The average thickness of interior permeable walls 23, 33 may be the same or different, depending upon the application and other factors including waste gas to be abated, combustible and non-combustible gases utilized, available interior permeable wall materials, etc.

In certain embodiments, a waste gas abatement system according to the present disclosure optionally comprises a cooling column for rapid cooling of gas exiting the reaction zone of the thermal reaction chamber. The cooling column may comprise, for example, a wet quench and scrubber as described in U.S. Pat. No. 5,603,905 or a dry quench utilizing a gas stream to mix with and cool the exiting gas. Such a wet cooling column may have an annular trough around its top end, which aligns with an open end of the thermal reaction chamber (for example, a bottom open end). Water may be supplied to the annular trough through a feedline, overflowing the cooling column to provide a continuous flow of water down the inner surface of the column, thereby cooling the reaction product stream leaving the reaction chamber and preventing particles in that stream from adhering to the inner surface of the cooling column. The gaseous stream and water discharge from the bottom end of the cooling column into a separator having a drain pipe for the withdrawal of water containing solid particulate matter and soluble compounds such as HF, HCl, and $SO_2$. The cooled gaseous stream exits from the separator through a pipe and is passed through a scrubber in any of its many known forms to capture residual soluble compounds in the gaseous stream leaving the separator. The scrubbed gas is vented to the atmosphere as an environmentally safe exhaust.

The waste gas abatement system of the present disclosure is designed and tested for the significant destruction of waste gases having high greenhouse gas indexes such as hexafluoroethane ($C_2F_6$) and tetrafluoromethane ($CF_4$), as well as particulate-forming gases, such as silane ($SiH_4$). Specifically, in one embodiment, the waste gas abatement system of the present disclosure has a Destruction Removal Efficiency (DRE, as measured by EPA Test Protocol 430-R-10-003 or similar protocol) of greater than 85% for perfluorocarbons. In another embodiment, the waste gas abatement system of the present disclosure has a DRE of greater than 90% for perfluorocarbons. In another embodiment, the waste gas abatement system of the present disclosure has a DRE of greater than 95% for perfluorocarbons. In another embodiment, the waste gas abatement system of the present disclosure has a DRE of greater than 97.5% for perfluorocarbons. In another embodiment, the waste gas abatement system of the present disclosure has a DRE of greater than 99% for perfluorocarbons. In a preferred embodiment, the waste gas abatement system of the present disclosure has a DRE greater than 95% for tetrafluoromethane. In addition to its high capacity for destruction of perfluorocarbons, the waste gas abatement system of the present invention efficiently destroys silane. In one embodiment, for example, the waste gas abatement system of the present disclosure has a DRE greater than 90% for silane. In another embodiment, the waste gas abatement system of the present disclosure has a DRE greater than 95% for silane. In yet another embodiment, the waste gas abatement system of the present invention has a DRE greater than 99% for silane.

EXAMPLES

The following non-limiting examples are provided to further illustrate the present invention. It should be appreciated by those of skill in the art that the techniques disclosed in the examples that follow represent approaches the inventors have found function well in the practice of aspects of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1—Silica Build-Up on a 6×7 and 3×7 Burner with Exemplary Embodiment

Figure 5:
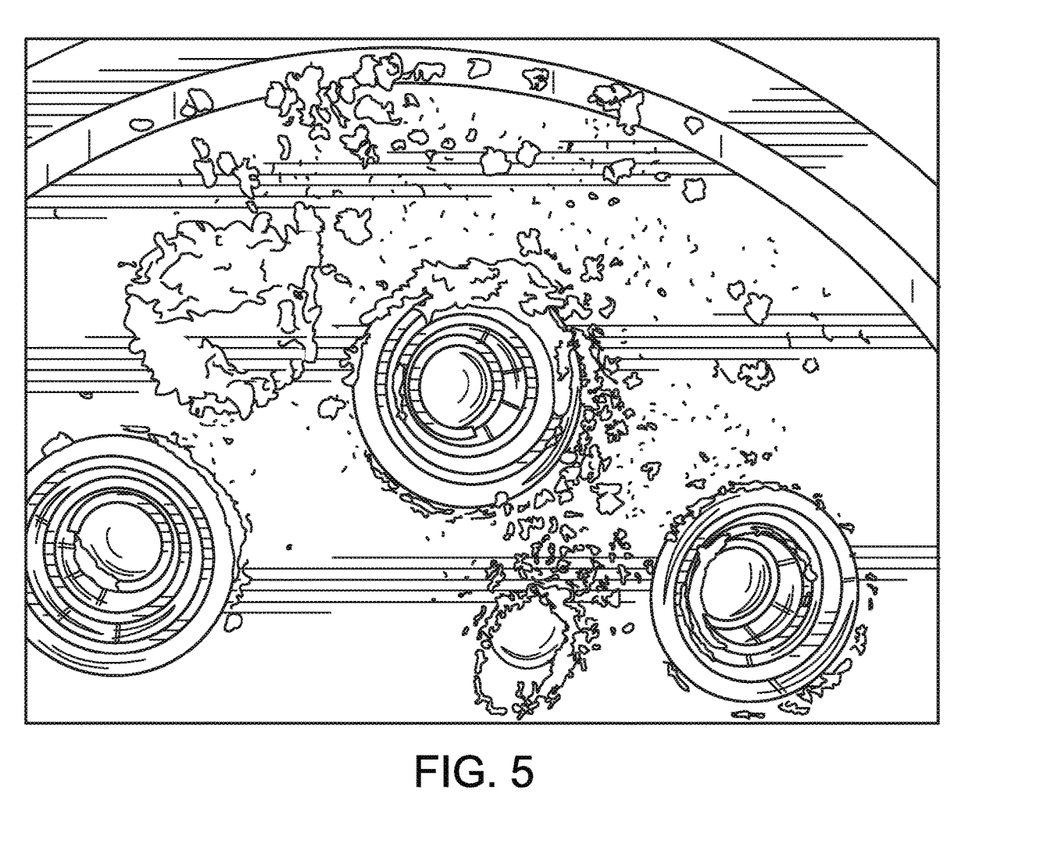
FIG. 5 is a schematic rendering of a photograph depicting the minimal buildup of solid particulate matter on the interior surface of the reaction chamber of the waste gas abatement system of the present disclosure, as further described in Example 1.

To investigate resistance to solid deposition, specifically from silica or other silicon containing solids, tests were conducted in a furnace having a similar configuration to FIG. 1. Second permeable interior wall (corresponding to 33 in FIG. 1) measured 7 inches inside diameter by 6 inches tall. The first permeable interior wall (corresponding to 23 in FIG. 1) was a 7 inch disc to form the ceiling with six apertures 25 to convey waste gas into the reaction chamber 30. Each waste gas tube was supplied with gas streams containing 50 liters per minute of nitrogen. An additional 2 liters per minute of silane was supplied to one waste gas tube. Natural gas and excess air were supplied through the second permeable wall to assist in destruction of the waste gas and 50 liters per minute of clean dry air was supplied to the first permeable wall to repel silica produced in the reaction zone. After 6480 liters of silane were consumed, the porous surfaces were inspected for deposition of silica. The first permeable wall had less than 0.15 cubic inches of silica deposited on the surface and flow from the waste gas nozzles was unimpeded as shown in FIG. 5.

Example 2—Silica Build-Up on a 6×7 Burner without Exemplary Embodiment

Figure 6:
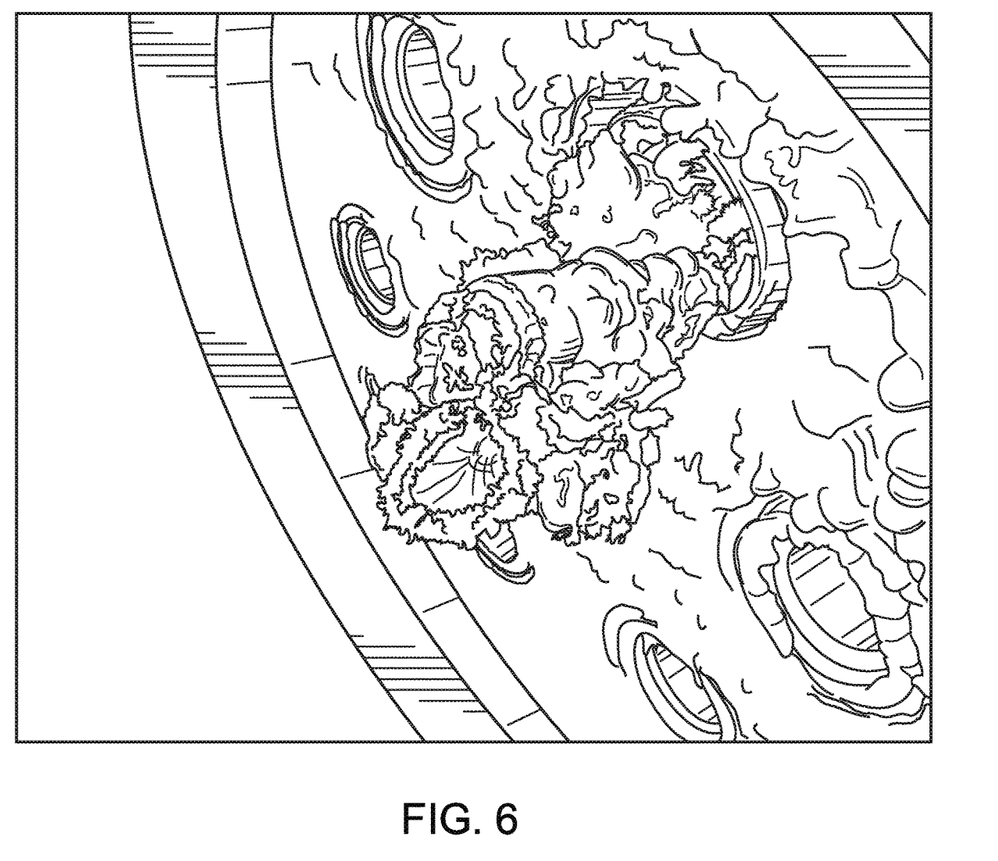
FIG. 6 is a schematic rendering of a photograph depicting the significant buildup of solid particulate matter on the interior surface of the reaction chamber of a prior art waste gas abatement system, as further described in Example 2.

A comparison test was done with the same reaction chamber as described in Example 1, except that the first permeable wall was replaced with a non-permeable refractory surface. After consumption of 2160 liters of silane at a flow rate of 2 liters per minute, more than 0.75 cubic inches of silica deposited on the non-permeable refractory surface and waste gas nozzle. The majority of the silica was observed as deposited at the base of the waste gas nozzle, forming a tubular structure of silica extending into the reaction zone as shown in FIG. 6. This amount of silica deposition would have a negative effect on the destruction efficiency of perfluorocarbons. From these tests, it can be asserted that the invention reduces silica build up by more than 90%.

Example 3—$CF_4$ and $NF_3$ Testing on 6×7 Burner with Exemplary Embodiment

Additional tests were performed to ensure that the increased resistance to solid deposition provided by the first permeable wall (as described in Example 1) would not impede the destruction of troublesome substances such as $CF_4$ and $NF_3$. $CF_4$ and $NF_3$ were selected as benchmark gases because such gases are difficult to destroy by thermal combustion. At the outset of experimentation, it was expected that the relatively cold, clean dry air provided through the first permeable wall would quench the reaction zone and reduce destruction efficiency. Surprisingly, however, the testing described herein demonstrated that utilization of a combination of non-combustible and combustible gases (or gas mixtures) for thermal combustion, which are directed through multiple permeable interior surfaces of a reaction chamber, efficiently and effectively prevents undesirable accumulation of solid particulate matter on the chamber surfaces.

Comparative tests were conducted on the same system configurations as previously described in Examples 1 and 2. Each system configuration was supplied, through a waste gas tube, with a gas stream comprising 50 liters per minute of nitrogen. In the system configuration of Example 1, 50 liters per minute of clean dry air were supplied through the first permeable wall. In each of the system configurations of Examples 1 and 2, $NF_3$ was supplied to one waste gas tube starting from 0.25 liters per minute and up to 3 liter per minute in 0.25 liter per minute increments. Destruction efficiency of $NF_3$ was measured at each increment of flowrate. Less than a 1% difference in destruction efficiency was found between the system configuration of Example 1 (with the first permeable wall) and the system configuration of Example 2 (with a non-permeable refractory surface).

The test was repeated with $CF_4$ instead of $NF_3$ and the results were particularly surprising. Each system (again as described in Examples 1 and 2) was supplied, through a waste gas tube, with a gas stream comprising $CF_4$ starting from 0.1 liters per minute and up to 1 liter per minute in 0.1 liter per minute increments. Additional fuel and oxidant was supplied to this waste gas tube through a supplemental gas inlet (e.g. shown as 14 in FIG. 1) to aid in the reaction per standard practice. It was found that $CF_4$ destruction was higher and more consistent with clean dry air supplied by the system configuration of Example 1 (having a first permeable wall) than with the system configuration of Example 2 (having a non-permeable refractory surface). Destruction efficiency of $CF_4$ with the porous surface ranged between 97% and 97.3%. Destruction efficiency of $CF_4$ without the porous surface ranged between 95.2% and 96.5%. The industry standard is greater than 95%.

Tests were repeated with $CF_4$ and $NF_3$ supplied to more of the waste gas tubes at once. Results were the same or better than those described above. Destruction efficiency is easier to achieve when more waste gas tubes are utilized to destroy troublesome gases due to the increased temperature and uniformity in the reaction zone.

The effect of air flow rate through the first permeable wall was tested further by varying the flow rate from 50 to 150 liters per minute. It was found that the ability to resist solids increases with increasing flow rate. The destruction efficiency of $NF_3$ was decreased with increasing flow, making 50 liter per minute the ideal flow rate for this particular geometry. The destruction efficiency of $CF_4$ was increased with increasing flow to the porous surface.

Further tests were done to verify the results described above with a different reaction zone geometry. A reaction zone measuring 6 inches in diameter by 6 inches long with 4 waste gas inlets instead of 6 was tested. Results closely matched those previous described.

Examples 4 and 5—Field Tests of a 6×6 Burner with Exemplary Embodiment

After successful laboratory testing, further testing was done in two field installations operating on commercial semiconductor processes. The field sites chosen were third-party operated and produced large amounts of silica. Before the testing began, these sites had installed systems comprising reaction chambers similar to the configuration described in Example 2; there was no first permeable wall present, but instead there was a non-permeable refractory surface. In this configuration, the machine operators experienced frequent service shut downs due to solid deposition inside the reaction chamber, requiring them to open the unit and remove the solids. The permeable surfaces were installed and operated over the course of six months. During this time silica deposition inside the reaction chamber decreased significantly.

In the Example 4 field site, the throughput of wafers between required services increased on average by a factor of 3.4 after installing the porous surface. In the Example 5 field site, the time between service increased by a factor of 2 while the amount of wafer deposition (total thickness deposited) also increased by a factor of 2 after installing the porous surface.

In view of the above, it will be seen that the several objects of the disclosure are achieved and other advantageous results attained. It will be apparent, however, to those familiar in the art, that many changes, variations, modifications, and other uses and applications for the subject systems and methods are possible. All such changes, variations, modifications, and other uses and applications that do not depart from the spirit and scope of the disclosure are deemed to be covered by the disclosure which is limited only by the claims which follow.

What is claimed is:

1. A system for combustive abatement of waste gases comprising:
   a) a waste gas inlet;
   b) an inlet manifold configured to receive the waste gas inlet, the inlet manifold comprising:
      a first plenum chamber having a first exterior wall and a first permeable interior wall,
      a first plenum inlet configured to supply a first gas through the first plenum chamber to the first permeable interior wall, and
      at least one aperture through the first plenum chamber, the at least one aperture being coupled to the waste gas inlet and extending through the first exterior wall and the first permeable interior wall of the first plenum chamber;
   c) a thermal reaction chamber coupled to the inlet manifold and configured to receive (i) a waste gas from the waste gas inlet through the at least one aperture and (ii) the first gas through the first permeable interior wall, the thermal reaction chamber comprising:
      a central chamber,
      a second plenum chamber at least partially surrounding the central chamber having a second plenum inlet configured to receive a supply of a second gas,
      a second permeable interior wall between the central chamber and the second plenum chamber, and
      a second exterior wall at least partially defining the second plenum chamber; and
   d) a controller configured to maintain a flow of the first gas, the second gas, or both the first and second gas, and control combustion at the surface of at least a portion of the first permeable interior wall and at least a portion of the second permeable interior wall,
   wherein
      i. at least a portion of the surface of the first permeable interior wall comprises a burner surface configured for permeation of a mixture comprising combustible gas and at least a portion of the surface of the second permeable interior wall is configured for permeation of a mixture comprising non-combustible gas; or
      ii. at least a portion of the surface of the second permeable interior wall comprises a burner surface configured for permeation of a mixture comprising a combustible gas and at least a portion of the surface of the first permeable interior wall is configured for permeation of a mixture comprising non-combustible gas.

2. A system in accordance with claim 1, wherein the inlet manifold is substantially cylindrical with a length to diameter ratio of between about 1:1 and about 1:6.

3. A system in accordance with claim 1, wherein the at least one aperture further comprises one or more microapertures in fluid communication with the first plenum chamber.

4. A system in accordance with claim 1, wherein the at least one aperture has a diameter of about ¼ inch to about 4 inches.

5. A system in accordance with claim 1, wherein the thermal reaction chamber is substantially cylindrical with a length to diameter ratio of between about 1:0.1 to about 1:10.

6. A system in accordance with claim 1, wherein at least one of the first permeable interior wall and the second permeable interior wall has an average thickness within the range of about 0.125 inches to about 2 inches.

7. A system in accordance with claim 1, wherein at least a portion of one or more of the first permeable interior wall and the second permeable interior wall comprises metal fiber, ceramic fiber, metal foam, ceramic foam, or combinations thereof.

8. A system in accordance with claim 1, wherein at least a portion of the surface of the first permeable interior wall comprises a burner surface configured for permeation of a mixture comprising a combustible gas and at least a portion of the surface of the second permeable interior wall is configured for permeation of a mixture comprising non-combustible gas.

9. A system in accordance with claim 1, wherein the first permeable interior wall and the second permeable interior wall have a surface area ratio in the range of about 1:0.1 to 1:10.

10. A system in accordance with claim 1, wherein at least a portion of the surface of the second permeable interior wall comprises a burner surface configured for permeation of a mixture comprising a combustible gas and at least a portion of the surface of the first permeable interior wall is configured for permeation of a mixture comprising non-combustible gas.

11. A system in accordance with claim 1, wherein the first permeable interior wall comprises a substantially horizontal ceiling of the thermal reaction chamber and the second permeable interior wall comprises a substantially vertical column of the thermal reaction chamber.

12. A system in accordance with claim 1, wherein the first permeable interior wall comprises a substantially vertical column of the thermal reaction chamber and the second permeable interior wall comprises a substantially horizontal ceiling of the thermal reaction chamber.

13. A system in accordance with claim 1, wherein the waste gas inlet is configured to supply the waste gas, in combination with an oxidant, fuel, or inert gas, to the reaction chamber.

14. A system in accordance with claim 1, wherein the combustible gas comprises hydrogen gas, one or more gaseous hydrocarbons, or mixtures thereof.

15. A system in accordance with claim 1, wherein the non-combustible gas comprises an inert gas, nitrogen, air, or combinations thereof.

16. A system in accordance with claim 1, wherein an oxidant is added to at least one of the first gas, the second gas, the combustible gas, or the non-combustible gas.

17. A system in accordance with claim 1, wherein the system further comprises an exit gas apparatus.

18. A system in accordance with claim 1, wherein a combustible gas feedline is connected to the first plenum inlet, the second plenum inlet, or the first and second plenum inlets.

19. A system in accordance with claim 1, wherein a non-combustible gas feedline is connected to the first plenum inlet, the second plenum inlet, or the first and second plenum inlets.

20. A system in accordance with claim 1, wherein the system further comprises at least one ignition element sufficient to ignite the combustible gas at one or more burner surfaces of the first permeable interior wall, the second permeable interior wall, or both the first and second permeable interior walls.

21. A system in accordance with claim 1, wherein the controller controls combustion by controlling at least one of (i) a flow rate of at least one of the first and second gas; (ii) a composition of at least one of the first and second gas; and (iii) ignition of one or more burner surfaces of at least one of the first and second permeable interior wall.

22. A system in accordance with claim 1, wherein the gas feedline delivers combustible gas, non-combustible gas, or a combination of combustible and non-combustible gas, to any one or more of the first plenum inlet, the second plenum inlet, or the first and second plenum inlet.

23. A method for the combustive abatement of waste gas using the system of claim 1, wherein the method comprises
    introducing a waste gas to the thermal reaction chamber through the waste gas inlet and the inlet manifold;
    controlling the flow of combustible gas at the burner surface of at least a one of the first and second permeable interior walls;
    controlling the flow of non-combustible gas to at least a portion of one or more of the first and second permeable interior walls
    wherein
    the combustible gas abates the waste gas, and
    the flow of non-combustible gas removes or prevents the formation of particles at the surface of at least one of the first or second permeable interior walls.

\* \* \* \* \*